(12) United States Patent
Steigerwald et al.

(10) Patent No.: US 9,025,352 B2
(45) Date of Patent: May 5, 2015

(54) TRANSFORMER TAP-CHANGING CIRCUIT AND METHOD OF MAKING SAME

(75) Inventors: Robert Louis Steigerwald, Burnt Hills, NY (US); Robert Dean King, Schenectady, NY (US); Manoj Ramprasad Shah, Latham, NY (US)

(73) Assignee: General Electric Company, Schenectady, NY (US)

( * ) Notice: Subject to any disclaimer, the term of this patent is extended or adjusted under 35 U.S.C. 154(b) by 300 days.

(21) Appl. No.: 13/475,186

(22) Filed: May 18, 2012

(65) Prior Publication Data

US 2013/0308361 A1 Nov. 21, 2013

(51) Int. Cl.
| H02M 7/81 | (2006.01) |
| H02M 7/77 | (2006.01) |
| H02M 5/12 | (2006.01) |
| H02M 7/217 | (2006.01) |
| H02M 7/162 | (2006.01) |

(52) U.S. Cl.
CPC ............ *H02M 5/12* (2013.01); *Y10T 29/49117* (2013.01); *H02M 7/81* (2013.01); *H02M 7/77* (2013.01); *H02M 7/217* (2013.01); *H02M 7/162* (2013.01)

(58) Field of Classification Search
CPC ......... H02M 7/75; H02M 7/757; H02M 7/77; H02M 7/79; H02M 7/81
USPC ................................ 363/129, 69–70; 323/340
See application file for complete search history.

(56) References Cited

U.S. PATENT DOCUMENTS

| 3,623,139 A | 11/1971 | Dickerson |
| 4,282,475 A | 8/1981 | Milton |
| 5,581,173 A | 12/1996 | Yalla et al. |
| 2003/0024750 A1 | 2/2003 | Ligman |
| 2003/0052651 A1 | 3/2003 | Crisp et al. |
| 2004/0189251 A1 | 9/2004 | Kutkut et al. |
| 2005/0046387 A1 | 3/2005 | Aker et al. |
| 2010/0118574 A1* | 5/2010 | Bourgeau ...................... 363/126 |
| 2011/0100735 A1 | 5/2011 | Flett |
| 2011/0215743 A1 | 9/2011 | Fukatsu |

OTHER PUBLICATIONS

Morcos et al., "Battery Chargers for Electric Vehicles", IEEE Power Engineering Review, Nov. 2000, pp. 8-11.

* cited by examiner

*Primary Examiner* — Harry Behm
*Assistant Examiner* — Matthew Grubb
(74) *Attorney, Agent, or Firm* — Ziolkowski Patent Solutions Group, SC; Jean K. Testa

(57) ABSTRACT

A transformer tap-changing circuit comprises an apparatus that includes a transformer comprising a secondary winding configured to inductively couple to a primary winding when a current is passed through the primary winding from an energy source, a first rectifier coupled to the secondary winding and configured to rectify a first AC voltage from the secondary winding into a first DC voltage, and a second rectifier coupled to the secondary winding and configured to rectify a second AC voltage from the secondary winding into a second DC voltage. The apparatus also includes a DC bus coupled to the first and second rectifiers and configured to receive the first and second DC voltages therefrom, wherein the first AC voltage is higher than the second AC voltage, and wherein the first DC voltage is higher than the second DC voltage.

20 Claims, 5 Drawing Sheets

TRANSFORMER TAP-CHANGING CIRCUIT AND METHOD OF MAKING SAME

BACKGROUND OF THE INVENTION

Embodiments of the invention relate generally to transformers and, more particularly, to tap-changing circuits designed to change the transformer turns ratio to alter its output energy.

New battery technologies are emerging that can accept very high charge currents and thus can be charged in relatively fast times. These batteries may be used, for example, in electric and hybrid vehicle traction applications (e.g., passenger vehicles, busses, transit cars, on-road and off-road vehicles, golf cars, neighborhood electric vehicles, forklifts, utility trucks, as well as other higher power storage applications). Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for acceleration, for example.

Plug-in electric vehicles, whether of the hybrid electric type or of the purely electric type, are configured to use electrical energy from an external source to recharge the traction battery. These vehicles may use either off-board stationary battery chargers or on-board battery chargers to transfer electrical energy from a utility grid or renewable energy source to the vehicle's on-board fraction battery.

Conventional tap-changing circuits involve a primary winding of a transformer coupled to a switch array including back-to-back thyristors or switch pairs that are used to connect a primary transformer winding tap to an AC source. This has the effect of changing the transformer turns ratio to alter the output voltage and current as needed during battery charging. The current is limited by the transformer impedance (i.e., leakage inductance). The transformer can be designed to have a 15 to 20% impedance. When the current drops off as the battery voltage increases, the transformer tap can be changed to increase the current back to a higher level. However, the components of such conventional tap-changing circuits are often expensive and employ complicated control techniques.

It would therefore be desirable to provide a cost-effective and reliable apparatus to provide high currents to DC loads.

BRIEF DESCRIPTION OF THE INVENTION

According to an aspect of the invention, an apparatus comprises a transformer including a secondary winding configured to inductively couple to a primary winding when a current is passed through the primary winding from an energy source, a first rectifier coupled to the secondary winding and configured to rectify a first AC voltage from the secondary winding into a first DC voltage, and a second rectifier coupled to the secondary winding and configured to rectify a second AC voltage from the secondary winding into a second DC voltage. The apparatus also includes a DC bus coupled to the first and second rectifiers and configured to receive the first and second DC voltages therefrom, wherein the first AC voltage is higher than the second AC voltage, and wherein the first DC voltage is higher than the second DC voltage.

According to another aspect of the invention, a method of making transformer tap-changing circuit includes coupling a secondary winding of a transformer to a first rectifier and to a second rectifier, and coupling the first and second rectifiers to a DC bus. The secondary winding is configured to inductively couple to a primary winding of the transformer when a current from an energy source is passed through the primary winding, and the first inverter is configured to rectify a first AC voltage from the secondary winding into a first DC voltage. The second rectifier is configured to rectify a second AC voltage lower than the first AC voltage from the secondary winding into a second DC voltage lower than the first DC voltage, and the DC bus is configured to receive the first and second DC voltages from the primary and secondary inverters.

According to yet another aspect of the invention, a system includes a DC bus, a variable DC load coupled to the DC bus, and a transformer comprising a set of secondary windings configured to inductively couple to a primary winding when a current is passed through the primary winding from an energy source. The system also includes a first rectifier coupled to the secondary winding and configured to rectify a first AC voltage from the secondary winding into a first DC voltage, a second rectifier coupled to the secondary winding and configured to rectify a second AC voltage lower than the first AC voltage from the secondary winding into a second DC voltage lower than the first DC voltage, and a controller configured to cause the first DC voltage to be supplied to the DC bus.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
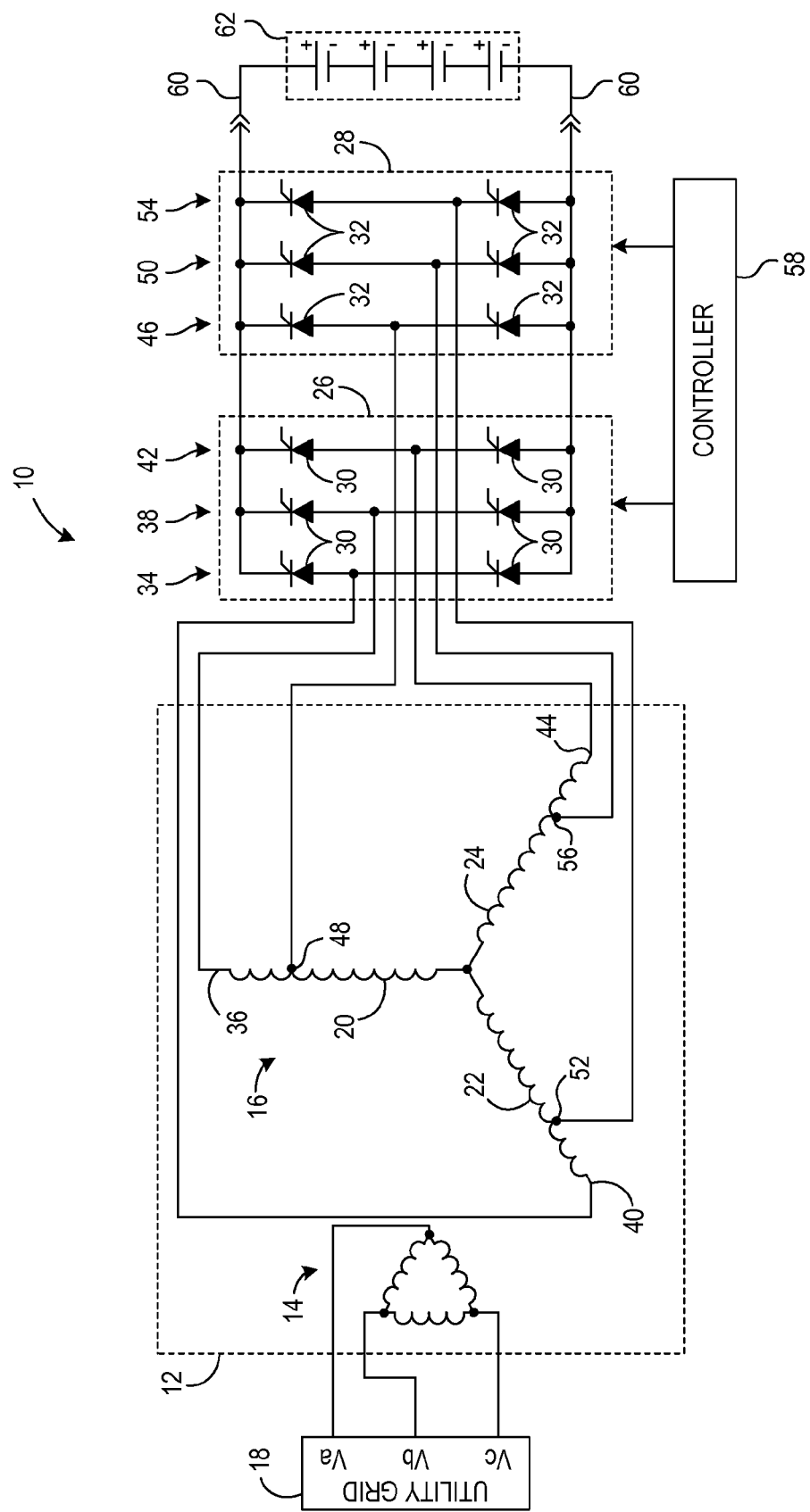
FIG. 1 is a schematic diagram of a transformer with an electronic tap-changer circuit according to an embodiment of the invention.

FIG. 1 is a schematic diagram of a transformer tap-changing circuit 10 according to an embodiment of the invention. A transformer 12 includes a primary transformer winding 14 and a secondary transformer winding 16. Primary transformer winding 14 is coupleable to an AC source, and as an example, is illustrated as being connected to three phases of the utility grid 18. Secondary transformer winding 16 includes three windings 20, 22, 24 coupleable to an AC load. In one embodiment, transformer 12 is a high-impedance transformer. Primary and secondary transformer windings 14, 16 are envisioned to be coupled inductively either through a conventional laminated steel core or coupled through a combination of a laminated core plus an air gap according to an embodiment.

As shown, an AC load including a pair of voltage inverters or rectifiers 26, 28. In this embodiment, the rectifiers 26, 28 employ thyristors or silicon-controlled rectifiers (SCRs) 30, 32, respectively, as the voltage rectification devices. Rectifiers 26, and/or 28 may be part of a single AC-to-DC converter assembly.

With respect to rectifier 26, a first pair 34 of the SCRs 30 is coupled to an end 36 of winding 20, a second pair 38 of the SCRs 30 is coupled to an end 40 of winding 22, and a third pair 42 of the SCRs 30 is coupled to an end 44 of winding 24.

With respect to rectifier 28, a first pair 46 of the SCRs 32 is coupled to a tap 48 of winding 20, a second pair 50 of the SCRs 32 is coupled to a tap 52 of winding 22, and a third pair 54 of the SCRs 32 is coupled to a tap 56 of winding 24. Taps 48, 52, 56 are coupled to windings 20-24 at locations that provide less voltage and current than their respective ends 36, 40, 44. By coupling rectifiers 26, 28 to secondary transformer winding 16 in this manner, rectifier 26 is configured to receive a higher amount of voltage and current from secondary transformer winding 16 for rectification than rectifier 28. In addition, rectifier 28 allows for tap changing and rectification performed in a single device.

Circuit 10 also includes a controller 58 to control SCRs 30, 32 during a voltage rectification mode of operation when it is desired to convert AC voltage from the AC source 18 to a DC voltage for supply to a DC link or bus 60. In one embodiment, it may be desirable to convert the AC voltage from the utility grid 18 to a DC voltage suitable for charging a DC load such as a battery 62. The converted DC voltage can have a higher or lower current supplied to battery 62 depending on the rectifier used.

During the voltage rectification mode, controller 58 may control rectifiers 26, 28 according to a phase-controlled approach and a non-phase-controlled approach. In the non-phase-controlled approach, controller 58 may first start by controlling SCRs 32 of rectifier 28 to their on states while leaving SCRs 30 of the rectifier 26 in their off states to rectify the tapped voltage supplied by secondary transformer winding 16 for recharging battery 62 with an initial limited current. This initial recharging of battery 62 using voltage and current based on taps 48, 52, 56, however, is not required, and embodiments of the invention contemplate beginning with active control of rectifier 26. After a period of time or after a predetermined threshold has been met, controller 58 may stop controlling SCRs 32 and may start controlling SCRs 30 of rectifier 26 to their on states, thus rectifying a higher voltage at a higher current for supply to battery 62. After battery 62 has been recharged, controller 58 may stop controlling SCRs 30 to stop the flow of current into battery 62. In one embodiment, as battery 62 is nearing its maximum state-of-charge (SOC), it may be desirable for controller 58 to switch back to active control of SCRs 32 of rectifier 28 to again limit the current flowing into battery 62.

In the phase-controlled approach, controller 58 may optimize control of the voltage and current flowing into battery 62 by activating respective SCRs 30, 32 based on the phase of the voltage induced on each winding 20-24. In this manner, controller 58 may be able to more fully control and regulate the voltage and current flowing into battery 62 to, for example, improve its battery life. Controller 58 may employ either or both of the phase-controlled and non-phase-controlled approaches. In one example, controller 58 may initially employ the non-phase-controlled approach followed by employment of the phase-controlled approach near the end of charge to precisely regulate the battery voltage.

While embodiments of the invention illustrated herein show connections of two rectifiers 26, 28 to two respective voltage positions (ends 36, 40, 44 and taps 48, 52, 56) along windings 20-24, embodiments of the invention contemplate using a greater number of voltage taps on windings 20-24. That is, additional taps (not shown) on windings 20-24 with corresponding rectifiers may be included. Furthermore, while discussed with respect to a three-phase AC voltage source, embodiments of the invention may include transformers and rectifiers having less or more phases to accommodate an AC voltage source having a lesser or a greater number of phases. Furthermore, it is anticipated that alternate transformer configurations that interface to the utility grid may be considered. For example, transformer configurations using high frequency power electronic circuitry to provide isolation and reduction in the size weight and cost of transformer component hardware may be used. Also, transformers using various forms of inductive coupling through conventional steel cores and/or combination steel core(s) plus air core(s) are envisioned.

Figure 2:
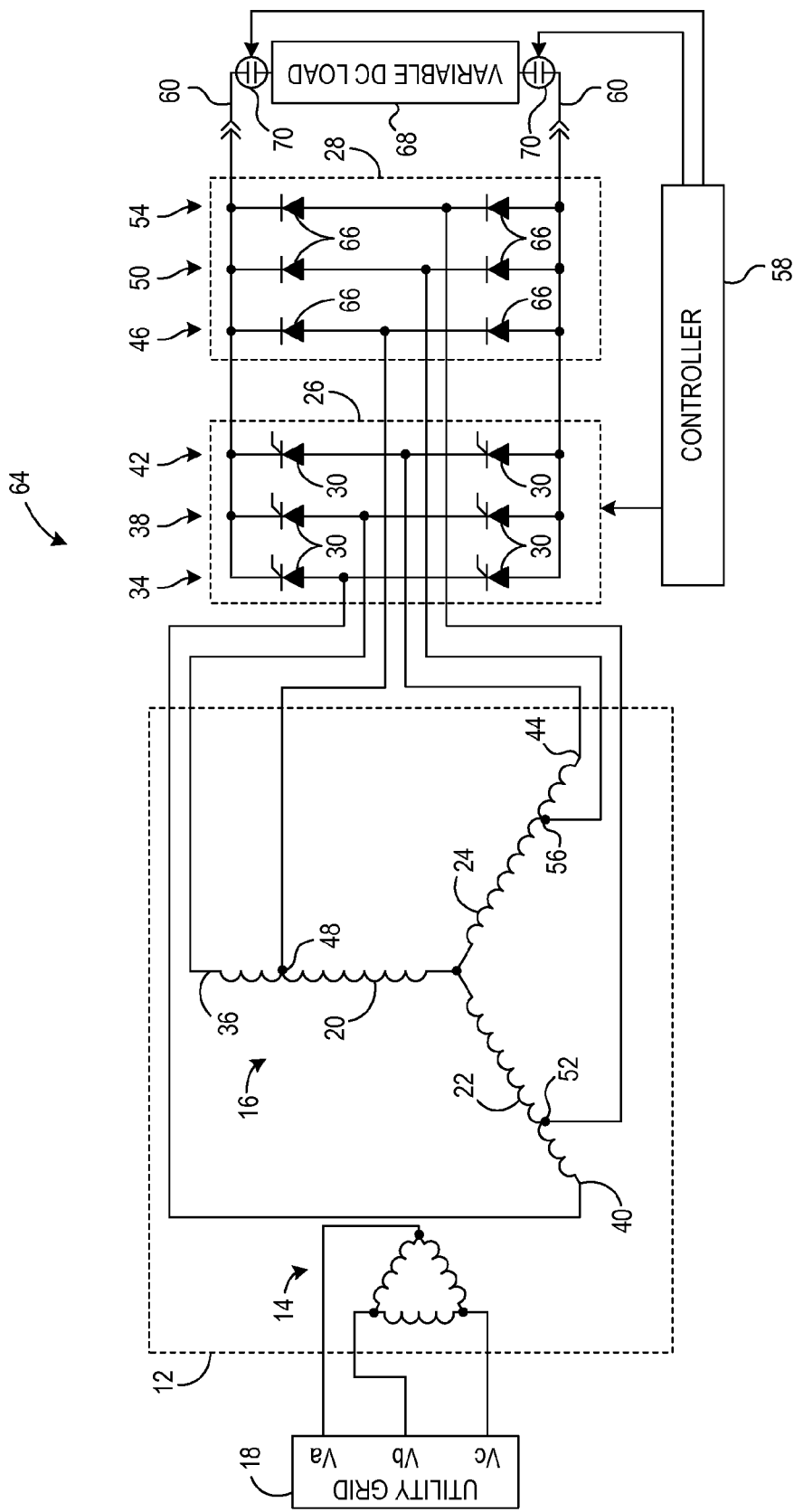
FIG. 2 is a schematic diagram of another transformer with an electronic tap-changer circuit according to an embodiment of the invention.
Figure 3:
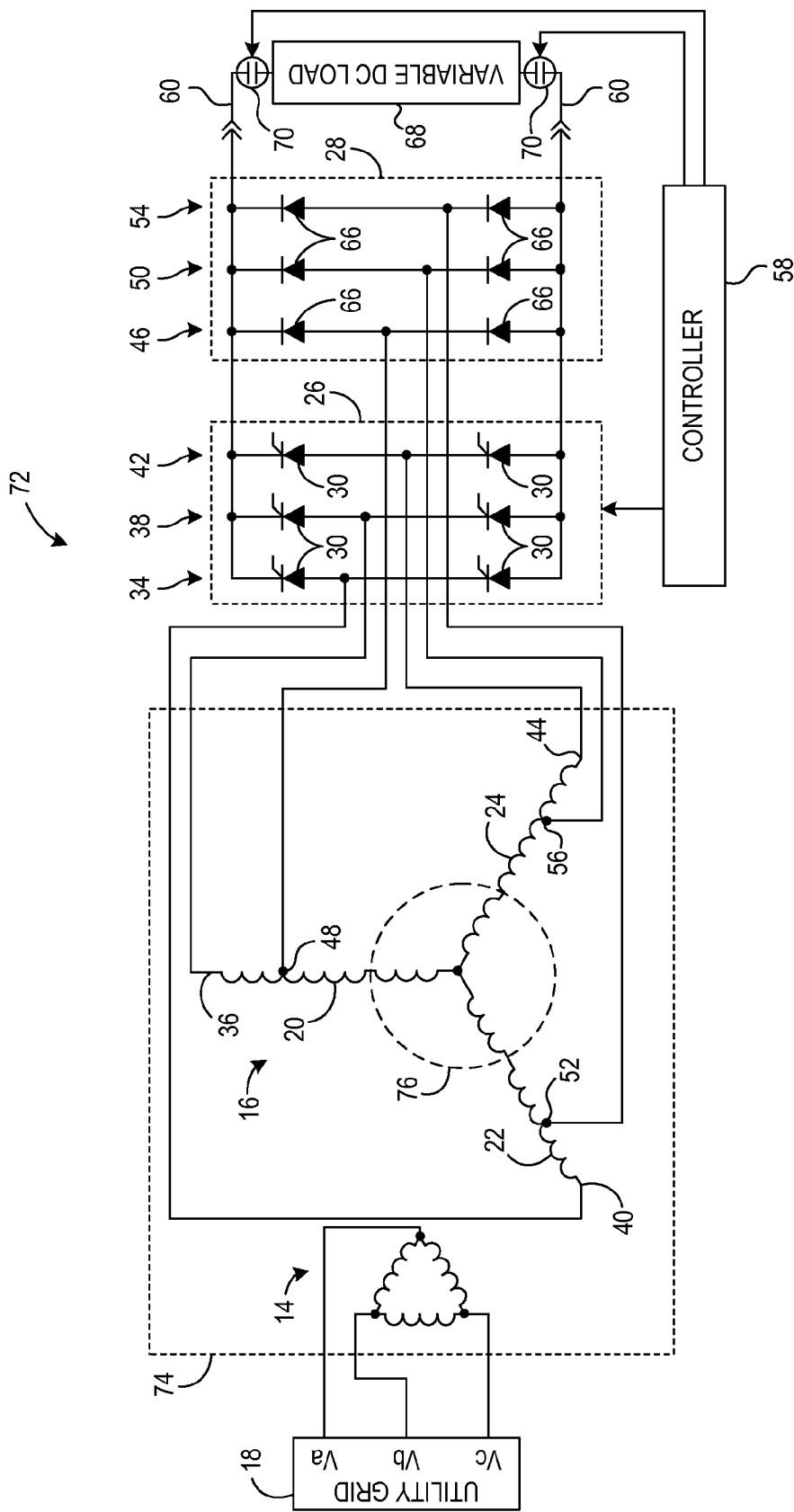
FIG. 3 is a schematic diagram of another transformer with an electronic tap-changer circuit according to an embodiment of the invention.
Figure 4:
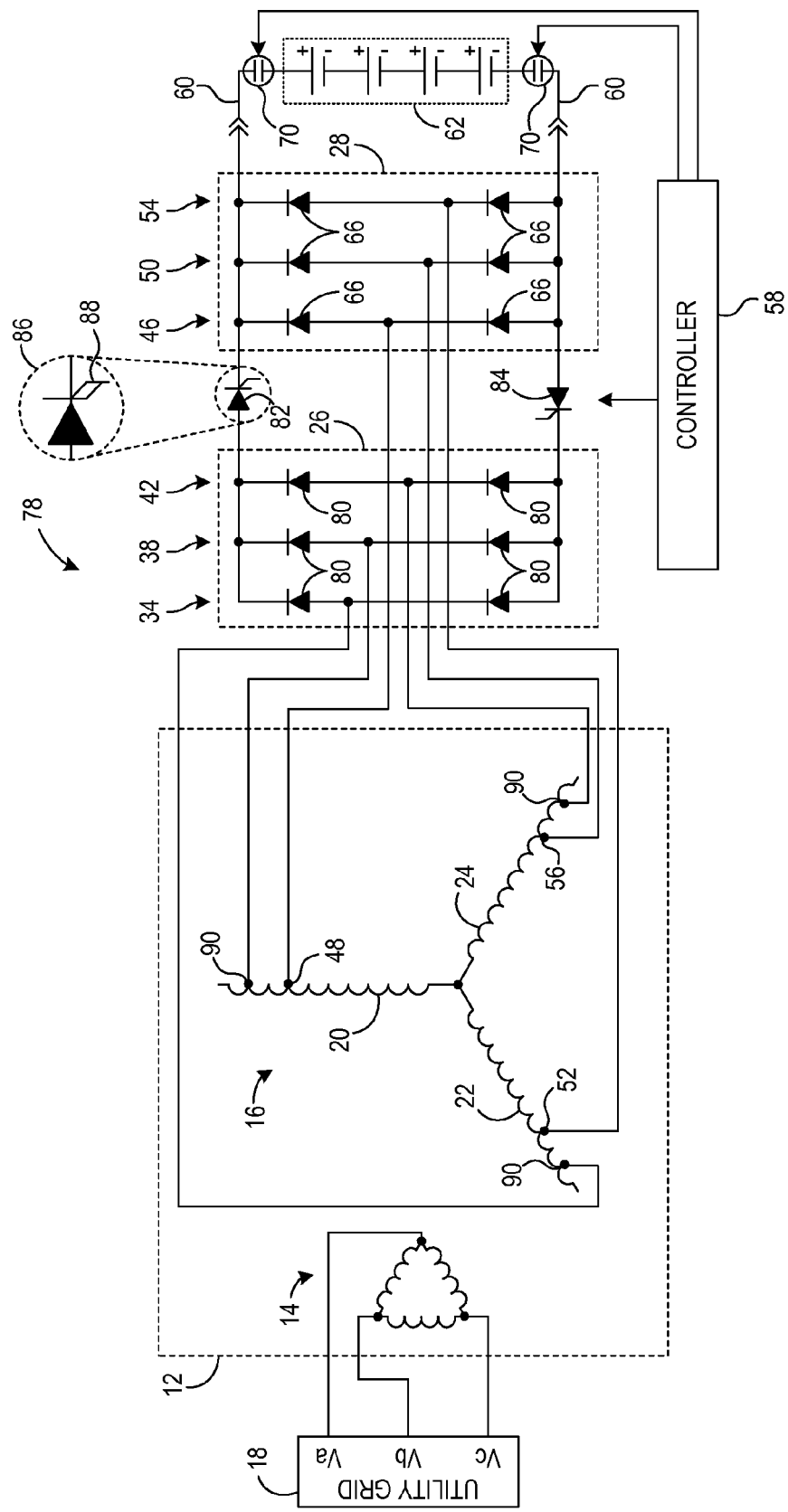
FIG. 4 is a schematic diagram of another transformer with an electronic tap-changer circuit according to an embodiment of the invention.

FIGS. 2-4 show schematic diagrams of transformer tap-changing circuits according to other embodiments of the invention. Elements and components in common will be discussed relative to the same reference numbers as appropriate.

FIG. 2 shows a transformer tap-changing circuit 64 incorporating diodes 66 into rectifier 28 rather than SCRs as illustrated in FIG. 1. The use of diodes 66 results in less control over the supply of voltage to DC bus 60 than tap-changing circuit 10. However, since gated drivers and SCRs 30 are generally more costly than diodes 66, circuit 64 allows a reduction in component costs.

FIG. 2 also shows a variable DC load 68 coupled to DC bus 60 for receiving the output of rectifier 26 or rectifier 28. Variable DC load 68 may be, for example, a battery, an ultracapacitor, an electromechanical or DC machine, a DC power system, or the like.

In an embodiment where variable DC load 68 does not have voltage storage capacity or where such capacity is less than the voltage supplied to DC link or bus 60 from taps 48, 52, 56, voltage is always present on DC bus 60 whenever a voltage is present on windings 20-24 of secondary transformer winding 16. Controller 58 may thus control rectifier 26 to increase the voltage on DC bus 60 over that provided by rectifier 28 when desired. When controlled to their on states, SCRs 30 supply a higher voltage to DC bus 60 than diodes 66, thus causing diodes 66 to stop supplying voltage to DC bus 60. In addition, tap-changing circuit 64 may incorporate one or more controllable coupling devices, including contactors or other switch devices 70 to decouple variable DC load 68 from DC bus 60 when recharging is complete or for another reason. Accordingly, coupling devices 70 selectively couple and decouple variable DC load 68 to/from DC bus 60.

If, in one embodiment, the voltage of the variable DC load 68 is greater than the voltage supplied by rectifier 28, current is not present on DC bus 60 when the voltage of variable DC load 68 is greater than the voltage supplied by rectifier 28 and when SCRs 30 are in their off state. Thus, it is possible to allow rectifier 28 to supply a lower current and voltage to variable DC load 68 during an initial recharging of variable DC load 68 and to control SCRs 30 to their on state for additional recharging. In this embodiment, when variable DC load 68 is fully charged or within a threshold of the desired voltage level and SCRs 30 are allowed to go into their off states, the voltage of variable DC load 68 prevents rectifier 28 from supplying voltage to DC bus 60.

According to an embodiment of the invention, transformer 12 is designed to provide current limiting impedance, which limits the DC current delivered. This impedance can be implemented using the leakage inductance of the transformer. Typical values may be from a few % to as much as 20% impedance based on the ratings of the transformer. This leakage inductance can limit or partially limit the current in all of the FIGS. 1 through 5. As shown in FIG. 3, in another embodiment of a transformer tap-changing circuit 72 having a transformer 74 not inherently meeting the desired current-limiting impedance, an inductor array 76 may be coupled to windings 20-24. Inductor array 76 may include a three-phase inductor or three single-phase inductors to provide the current-limiting impedance. Discrete inductor array 76 can be used if it is desired to not design this current-limiting impedance into the transformer itself such as, for example, when using a transformer based on an existing design.

FIG. 4 shows a transformer tap-changing circuit 78 according to an embodiment of the invention. Similar to circuit 64 shown in FIGS. 2 and 3, diodes 66 are incorporated into rectifier 28. In addition, however, rectifier 26 also incorporates diodes 80. To prevent rectifier 26 from causing rectifier 28 to remain in an off state since rectifier 26 incorporates diodes 80 rather than controllable devices such as the SCRs illustrated in other embodiments, tap-changing circuit 78 includes a pair of switches 82, 84 coupled between rectifiers 26 and 28 and controllable by controller 58. In this manner, switches 82, 84 selectively couple and decouple rectifier 26 to/from rectifier 28 and DC bus 60.

In one embodiment, switches 82, 84 are SCRs such as those described above. During an initial recharging of battery 62, contactors 70 are closed, SCR switches 82, 84 are left in their off state, and voltage from secondary transformer winding 16 is rectified in rectifier 28 and supplied to DC bus 60. When a higher voltage and current from secondary transformer winding 16 is desired, controller 58 controls SCR switches 82, 84 to their on state, and higher voltage rectified by rectifier 26 causes rectifier 28 to turn off, thus allowing the rectified voltage from rectifier 26 to be supplied to DC bus 60. Once controlled to their on state, SCR switches 82, 84 cannot turn off in this configuration until the current flowing therethrough falls below their holding current thresholds such as when contactors 70 are opened or when current from secondary transformer winding 16 is removed.

In another embodiment, switches 82, 84 may be a gate turn-off thyristor (GTO) switches 86 capable of being turned on and off by its gate lead 88. In this manner and contrary to that described above with respect to SCR switches 82, 84, once controlled to their on states (e.g., by applying a gate signal of positive polarity to gate lead 88), GTO switches 82, 84 can also be actively controlled to their off states by applying a gate signal of negative polarity to gate lead 88. Alternatively, or in addition thereto, controller 58 may cause contactors 70 to open or cause current from secondary transformer winding 16 to cease to cause GTO switches 82, 84 to turn off via a reduction of the holding current flowing therethrough similar to that described above.

In yet other embodiments, switches 82, 84 may be other suitable power switches such as insulated gate bipolar transistors (IGBTs), metal-oxide-semiconductor field-effect transistors (MOSFETs), insulated gate-controlled thyristors (IGCTS) and the like.

As also illustrated in FIG. 4, diodes 80 of rectifier 26 are coupled to taps 90 rather than to ends 36, 40, 44 as shown in FIGS. 1-3. In this manner, embodiments of the invention envision coupling the higher voltage rectifier (e.g., rectifier 26) to tap positions along winding 20-24 in other locations than ends 36, 40, 44, so long as the voltage at taps 90 is higher than that provided to the lower voltage rectifier (e.g., rectifier 28) from taps 48, 52, 56.

Figure 5:
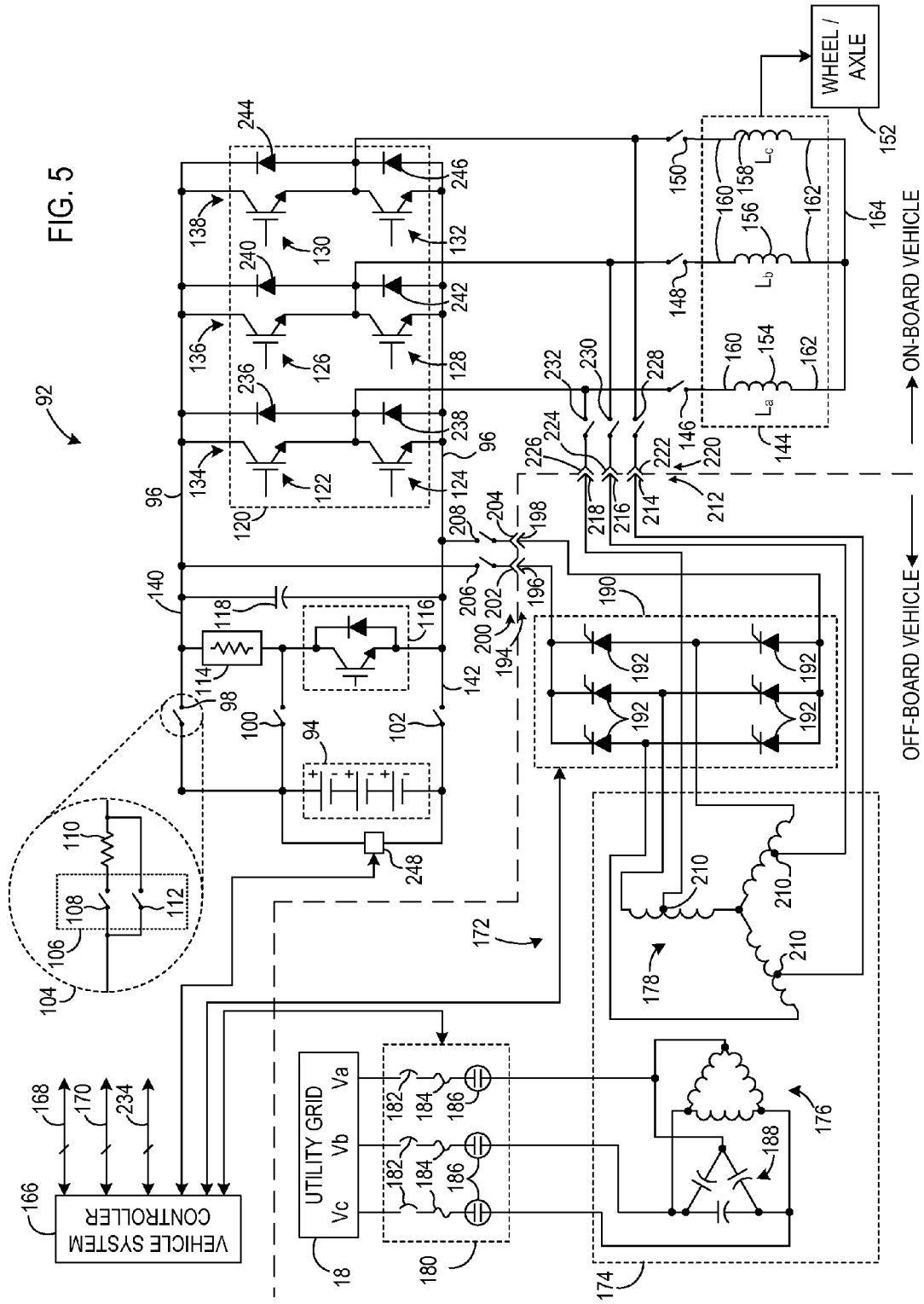
FIG. 5 is a schematic diagram of a traction circuit incorporating a transformer with an electronic tap-changer circuit according to an embodiment of the invention.

FIG. 5 is a schematic diagram of a traction system 92 according to an embodiment of the invention. Traction system 92 includes a first energy storage device 94. In one embodiment, first energy storage device 94 is a high-voltage energy storage device and may be a battery, a flywheel system, fuel cell, an ultracapacitor, or the like. First energy storage device 94 is coupleable to a DC link or bus 96 via an array of contactors or switches 98, 100, 102. As described below, switches 98-102 are controlled during operation of traction system 92 in a motoring mode and in a recharging mode.

In one embodiment as shown in further detail at 104, switch 102 may include a switch array 106 coupled between first energy storage device 94 and DC bus 96. Switch array 106 includes a first switch 108 coupled in series with a pre-charge resistor 110. A second switch 112 is coupled in parallel with first switch 108 and pre-charge resistor 110. When switch 108 is closed and switch 112 is open, current flowing through switch 108 is directed to flow through pre-charge resistor 110. When switch 112 is closed and switch 108 is open, current flowing through switch 112 is directed to bypass pre-charge resistor 110. Switches 98, 100 may also include that shown in detail 104.

Traction system 92 includes a resistor bank 114 having one or more resistors coupled to switches 98-102 and to one or more control circuits 116 that are controllable during a regenerative braking event to dissipate energy on DC bus 96 not used for recharging first energy storage device 94 or other energy storage devices of traction system 92. Resistor bank 114 and control circuit 116 form a regenerative braking dissipation circuit. The regenerative braking function during operation of resistor bank 114 and control circuit provides protection of an overvoltage of the DC link and associated components, in the event that the respective energy storage device 94 or other energy storage devices of traction system 92 are not able to accept all of the regenerative energy being applied to the DC link. A DC link filter capacitor 118 coupled to DC bus 96 provides a smoothing function for DC bus 96 and filters high-frequency currents on DC bus 96.

A bi-directional voltage modification assembly 120 is coupled to DC bus 96 and may be coupled to first energy storage device 94 via switches 98-102. In one embodiment, bi-directional voltage modification assembly 120 is a bi-directional DC-to-AC voltage inverter. Bi-directional DC-to-AC voltage inverter 120 includes six half phase modules 122, 124, 126, 128, 130, and 132 that are paired to form three phases 134, 136, and 138. Each phase 134, 136, 138 is coupled to a pair of conductors 140, 142 of DC bus 96. An electromechanical device or motor 144 is coupled to bi-directional DC-to-AC voltage inverter 120 via a plurality of contactors or switches 146, 148, 150. In one embodiment, electromechanical device 144 is a traction motor mechanically coupled to one or more driving wheels or axles 152 of a vehicle (not shown) or other electrical apparatus including cranes, elevators, or lifts. Electromechanical device 144 includes a plurality of windings 154, 156, and 158 having a plurality of conductors 160 coupled to respective phases 134, 136, 138 of bi-directional DC-to-AC voltage inverter 120. Windings 154-158 also have a plurality of conductors 162 coupled together to form a common or neutral node 164.

Traction system 92 includes a vehicle system controller 166 coupled to half phase modules 122-132 via control lines 168. In a motoring mode, controller 166 controls switches 98, 102 to a closed state and switch 100 to an open state via control lines 170 such that energy from first energy storage device 94 is transferred to DC bus 96. Through appropriate control of half phase modules 122-132, controller 166 is configured to control bi-directional DC-to-AC voltage inverter 120 to convert a DC voltage or current on DC bus 96 to an AC voltage or current for supply to windings 154-158 via conductors 160. Accordingly, the DC voltage or current from first energy storage device 94 may be transferred to DC bus 96 and converted into an AC voltage or current and delivered to motor 144 to drive wheels 152. In other non-vehicle propulsion systems, the drive wheels 152 may be another type of load (not shown), including a pump, fan, winch, crane, or other motor driven loads. In a regenerative braking mode, electromechanical device 144 may be operated as a generator to brake wheels 152 and to supply AC voltage or current to bi-directional DC-to-AC voltage inverter 120 for inversion into a DC voltage or current onto DC bus 96 that is suitable for recharging first energy storage device 94.

When a vehicle or apparatus incorporating traction system 92 is parked or not in use, it may be desirable to plug the vehicle into, for example, the utility grid or to a renewable energy source to refresh or recharge energy storage device 94. Accordingly, FIG. 5 shows an embodiment of the invention including an external electronic tap-changer circuit 172 coupled to traction system 92 for the recharging of energy storage device 94.

Circuit 172 includes a high-impedance transformer 174 (or a conventional transformer with external current-limiting inductance) having a plurality of primary and secondary windings 176, 178. While high-impedance transformer 174 is shown as a poly-phase utility system having three phases, it is contemplated that the high-impedance transformer poly-phase source could instead have one, two, six, or any other number of phases. Primary windings 176 are coupled to an electric vehicle service equipment (EVSE) interface 180 that is coupled to an AC source such as the utility grid 18. EVSE interface 180 includes a plurality of circuit breakers 182, fuses 184, and contactors 186. A capacitor array 188 is coupled in parallel with primary windings 176 and adds power factor correction.

Secondary windings 178 are coupled to a rectifier 190 having a plurality of SCRs 192 in one embodiment. Rectifier 190 is coupled to a receptacle or plug 194 having contacts 196, 198. Plug 194 is configured to mate with a plug 200 of traction system 92 having contacts 202, 204. Plug 200 is coupleable to DC bus 96 via a pair of contactors or switches 206, 208 that allow energy from traction system 92 to be disconnected from plug 200 when no charging system 172 is attached thereto.

Secondary windings 178 also have a plurality of taps 210 coupled thereto that are also coupled to a receptacle or plug 212 having contacts 214, 216 218. Plug 194 is configured to mate with a plug 220 of traction system 92 having contacts 222, 224, 226. Plug 220 is coupleable to bi-directional voltage modification assembly 120 via a plurality of contactors or switches 228, 230, 232 that allow energy from traction system 92 to be disconnected from plug 220 when no charging system 172 is attached thereto.

In a charging or recharging mode of operation, charging energy, such as current or voltage, from electronic tap-changer circuit 172 is used to recharge first energy storage device 94. Prior to closing switches 206, 208 to allow energy from the utility grid 18 to enter into traction system 92, controller 166 performs a standard handshaking with EVSE interface 180 to ensure that no faults are present or indicated by EVSE interface 180 and to couple the utility grid 18 to transformer 174 via the closing of contactors 186. Controller 166 may additionally cause switches 100, 102 to close to cause a voltage from first energy storage device 94 to pre-charge the filter capacitor 118. In one embodiment, the pre-charging of filter capacitor 118 may also include closing first switch 108 of switch 102 such that the voltage from first energy storage device 94 passes through both pre-charge resistor 110 of switch 102 and through one or more resistors of resistor bank 114.

After filter capacitor 118 has been pre-charged and handshaking indicates that no faults are present, controller 166 closes switches 228-232 and opens switches 146-150 via control lines 234 to allow tapped energy from secondary windings 178 to enter into traction system 92 during a first stage of the recharging operation. Diodes 236-246 of respective half phase modules 122-132 rectify the AC energy from tapped secondary windings 178 similar to diodes 66 of rectifier 28 as described above. The rectified charging voltage is transferred to DC bus 96. Note that there is no motor shaft movement due to switches 146-150 being in their open state.

During the first stage of the recharging operation, the charging energy from DC bus 96 is supplied to first energy storage device 94 having an initial low state-of-charge (SOC) through resistor bank 114. Switches 100, 102 are closed if they have not already been closed to pre-charge in the filter capacitor 118 as described above. If present, second switch 112 of switch 102 may be closed, and first switch 108 may be opened to prevent the charging energy from flowing through pre-charge resistor 110. The charging energy from DC bus 96 flows through one or more resistors of resistor bank 114 and into first energy storage device 94. The charging energy is limited at least by an impedance of high-impedance voltage source 174, by the tap voltage at taps 210, and by the one or more resistors of resistor bank 114.

In one embodiment, controller 166 is programmed to maintain the first stage of recharging for a period of time. The period of time may be predetermined and may be based, for example, on the amount of time that first energy storage device 94 takes to be charged to a first threshold value based on a minimum SOC. Alternatively, the period of time may be dynamically based on the current SOC of first energy storage device 94 when the recharging mode of operation begins. For example, controller 166 may determine the SOC of first energy storage device 94 via a voltage sensor 248 coupled thereto to determine the time it will take first energy storage device 94 to reach an SOC capable of allowing the second stage of recharging to begin. Alternatively, the SOC of the energy storage device may be communicated to controller 166 through a dedicated Battery Management Interface (BMI) unit (not shown) that could be contained within the energy storage device 94. In addition, based on the determined SOC of first energy storage device 94 at the time of initial recharging, controller 166 may determine that the SOC of first energy storage device 94 is already above the first threshold value and may thus eliminate the first stage of recharging altogether.

When the period of time for the first stage has elapsed, controller 166 closes switch 98 (i.e., second switch 112 of switch 98 if present) and opens switch 100 to allow the charging energy to flow directly into first energy storage device 94 from DC bus 96 and to eliminate the power loss through the resistor(s) 114 during a second stage of the recharging mode of operation. At any time during the second stage, controller 166 closes switches 206, 208 and actively controls SCR switches 192 to rectify the full voltage supplied by secondary windings 178. Since the rectified voltage of the full voltage supplied by secondary windings 178 is greater than the rectified voltage of the tapped voltage supplied by taps 210, diodes 236-246 turn off, and rectification of the tapped voltage halts. Controller 166 may allow the voltage on DC bus 96 to return to the value of the rectified tapped voltage by stopping active control of SCR switches 192. Alternatively or in addition thereto, controller 166 could open switches 206, 208.

The charging energy from DC bus 96 flows into first energy storage device 94, which, in one embodiment, has an instantaneous acceptance capability that is larger than an instantaneous delivery capability of electronic tap-changer circuit 172. The charging energy is limited at least by an impedance of electronic tap-changer circuit 172.

Controller 166 senses a voltage of first energy storage device 94 via voltage sensor 248 and regulates charging of first energy storage device 94 such that its voltage does not exceed a specified level. Near the end of charging, controller 166 also regulates the recharging voltage on DC bus 96 to a "float voltage" as the recharging current tapers to low levels. For example, controller 166 may actively control voltage inverter 120 to act as active rectifier to accurately complete charging. Alternatively, a phase-controlled approach of rectifier 190 may also be used to accurately complete charging.

In a motoring mode of operation, energy from energy storage device 94 is used to power motor 144 to turn wheels 152 or another device connected to motor 144. Prior to transferring energy from DC bus 96 to motor 144 via bi-directional voltage modification assembly 120, controller 166 may cause first switch 108 of switch 98 or switch 102, if present, to pre-charge filter capacitor 118 if necessary. To transfer energy from DC bus 96 to motor 144, controller 166 ensures that switch 100 is open and switches 98, 102 (or second switches 112 thereof) are closed, switches 146-150 are closed, and switches 206-206 and 228-232 are open. Controller 166 then operates DC-to-AC voltage inverter 120 to invert a DC voltage from first energy storage device 94 on DC bus 96 into an AC voltage for operating motor 144.

In a regenerative braking mode of operation, controller 166 may be configured to operate motor 144 in a regenerative mode, wherein electric power or energy is returned to DC link 60 through DC-to-AC inverter 120 during a regenerative braking event. In this regenerative braking mode, controller 166 may cause regenerative power or energy to partially or fully replenish first energy storage device 94 directly coupled on DC link 60. If the ability of first energy storage device 94 to accept a high level of charging exists, switches 98 and 102, in a closed state, allow all of the regenerative energy to be supplied to first energy storage device 94 if desired. As the ability of first energy storage device 94 to accept a high level of charging diminishes, controller 166 may control the control circuit 116 coupled to resistor bank 114 such that a portion of the remaining energy on DC bus 96 during the regenerative braking event may be dissipated through the resistors of resistor bank 114. In this manner, some, but not all, of the energy is still supplied to first energy storage device 94. Controller 166 may open at least switch 98 when first energy storage device 94 is fully charged.

In another embodiment, rectifier 190 may be configured to have diodes as shown with respect to rectifier 26 in FIG. 4. In this embodiment, since rectifier 190 will supply a DC voltage to plug 194 in response to a voltage from secondary windings 178, appropriate control of switches 206, 208 by controller 166 can ensure that the desired DC voltage from rectifier 190 or diodes 236-246 is delivered to DC bus 96.

In the embodiment illustrated in FIG. 5, a single energy storage device (94) directly coupled to the DC link is shown. Embodiments of the invention also contemplate configurations with one or more energy storage devices, including a second energy storage device where the voltage of the second energy storage device is decoupled from the DC link voltage via bi-directional boost converter (not shown).

Therefore, according to an embodiment of the invention, an apparatus comprises a transformer including a secondary winding configured to inductively couple to a primary winding when a current is passed through the primary winding from an energy source, a first rectifier coupled to the secondary winding and configured to rectify a first AC voltage from the secondary winding into a first DC voltage, and a second rectifier coupled to the secondary winding and configured to rectify a second AC voltage from the secondary winding into a second DC voltage. The apparatus also includes a DC bus coupled to the first and second rectifiers and configured to receive the first and second DC voltages therefrom, wherein the first AC voltage is higher than the second AC voltage, and wherein the first DC voltage is higher than the second DC voltage.

According to another embodiment of the invention, a method of making transformer tap-changing circuit includes coupling a secondary winding of a transformer to a first rectifier and to a second rectifier, and coupling the first and second rectifiers to a DC bus. The secondary winding is configured to inductively couple to a primary winding of the transformer when a current from an energy source is passed through the primary winding, and the first inverter is configured to rectify a first AC voltage from the secondary winding into a first DC voltage. The second rectifier is configured to rectify a second AC voltage lower than the first AC voltage from the secondary winding into a second DC voltage lower than the first DC voltage, and the DC bus is configured to receive the first and second DC voltages from the primary and secondary inverters.

According to yet another embodiment of the invention, a system includes a DC bus, a variable DC load coupled to the DC bus, and a transformer comprising a set of secondary windings configured to inductively couple to a primary winding when a current is passed through the primary winding from an energy source. The system also includes a first rectifier coupled to the secondary winding and configured to rectify a first AC voltage from the secondary winding into a first DC voltage, a second rectifier coupled to the secondary winding and configured to rectify a second AC voltage lower than the first AC voltage from the secondary winding into a second DC voltage lower than the first DC voltage, and a controller configured to cause the first DC voltage to be supplied to the DC bus.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An apparatus comprising:
a transformer comprising a secondary winding configured to inductively couple to a primary winding when a current is passed through the primary winding from an energy source;
a first rectifier coupled to the secondary winding and configured to rectify a first AC voltage from the secondary winding into a first DC voltage;
a second rectifier coupled to the secondary winding and configured to rectify a second AC voltage from the secondary winding into a second DC voltage;
a DC bus coupled to the first and second rectifiers and configured to receive the first and second DC voltages therefrom;
an energy storage device configured to output a DC voltage and coupled to the DC bus;
a bi-directional DC-to-AC voltage inverter coupled to the energy storage device and to the DC bus, wherein the bi-directional DC-to-AC voltage inverter comprises the second rectifier;
an electromechanical device coupled to the bi-directional DC-to-AC voltage inverter; and
a controller configured to control the bi-directional DC-to-AC voltage inverter to invert the DC voltage from the energy storage device into a third AC voltage suitable for energizing the electromechanical device;
wherein the first AC voltage is higher than the second AC voltage; and
wherein the first DC voltage is higher than the second DC voltage.

2. The apparatus of claim 1 wherein the first rectifier comprises a first plurality of controllable switches; and
further comprising a controller configured to control the first plurality of controllable switches to rectify the first AC voltage into the first DC voltage.

3. The apparatus of claim 2 wherein the controllable switches of the first plurality of controllable switches comprise silicon-controlled rectifiers.

4. The apparatus of claim 2 wherein the second rectifier comprises a second plurality of controllable switches; and
wherein the controller is further configured to control the second plurality of controllable switches to rectify the second AC voltage into the second DC voltage.

5. The apparatus of claim 4 wherein the controllable switches of the first and second pluralities of controllable switches comprise silicon-controlled rectifiers.

6. The apparatus of claim 2 wherein the second rectifier comprises a plurality of diodes configured to rectify the second AC voltage into the second DC voltage.

7. The apparatus of claim 6 further comprising:
a variable DC load; and
a coupling device coupled to the DC bus and to the variable DC load, the coupling device configured to selectively couple the variable DC load to the DC bus and comprising one of a contactor and an electronic switch.

8. The apparatus of claim 1 wherein the first and second rectifiers comprise a plurality of diodes configured to respectively rectify the first and second AC voltages into the first and second DC voltages; and
further comprising:
a controllable switch coupled to the DC bus and configured to couple the first rectifier to the second rectifier and to the DC bus; and
a controller configured to control the controllable switch to selectively couple the first rectifier to the DC bus to cause the first DC voltage to be transferred to the DC bus.

9. The apparatus of claim 8 wherein the controllable switch comprises one of a silicon-controlled rectifier and a gate turn-off thyristor.

10. The apparatus of claim 1 further comprising an inductor array coupled to the secondary winding configured to increase an impedance of the transformer.

11. The apparatus of claim 1 wherein the first rectifier is coupled to a winding of the secondary winding at a first location;
wherein the second rectifier is coupled to a tap along the winding of the secondary winding at a second location different from the first location; and
wherein the secondary winding provides the first AC voltage at the first location and the second AC voltage at the second location.

12. A method of making a transformer tap-changing circuit comprising:
coupling a secondary winding of a transformer to a first rectifier and to a second rectifier; and
coupling the first and second rectifiers to a DC bus;
wherein the secondary winding is configured to inductively couple to a primary winding of the transformer when a current from an energy source is passed through the primary winding;
wherein the first rectifier is configured to rectify a first AC voltage from the secondary winding into a first DC voltage;
wherein the second rectifier is configured to rectify a second AC voltage lower than the first AC voltage from the secondary winding into a second DC voltage lower than the first DC voltage;
wherein the DC bus is configured to receive the first and second DC voltages from the first and second rectifiers; and
wherein coupling the first rectifier to the DC bus comprises:
coupling a controllable switch between the first rectifier and the DC bus; and
configuring a controller to control the controllable switch to selectively couple the first rectifier to the DC bus to cause the first DC voltage to be transferred to the DC bus.

13. The method of claim 12 further comprising forming the first rectifier from a first plurality of controllable switches; and
further comprising configuring a controller to control the first plurality of controllable switches to rectify the first AC voltage into the first DC voltage.

14. The method of claim 13 further comprising forming the second rectifier from a second plurality of controllable switches; and
further comprising configuring the controller to control the second plurality of controllable switches to rectify the second AC voltage into the second DC voltage.

15. The method of claim 12 further comprising forming the first and second rectifiers from a plurality of diodes, wherein the diodes are configured to respectively rectify the first and second AC voltages into the first and second DC voltages.

16. A system comprising:
a DC bus;
a variable DC load coupled to the DC bus;
a transformer comprising a secondary winding configured to inductively couple to a primary winding when a current is passed through the primary winding from an energy source;
a first rectifier coupled to the secondary winding and configured to rectify a first AC voltage from the secondary winding into a first DC voltage;
a second rectifier coupled to the secondary winding and configured to rectify a second AC voltage lower than the first AC voltage from the secondary winding into a second DC voltage lower than the first DC voltage;
a controller configured to cause the first DC voltage to be supplied to the DC bus; and
a pair of controllable switches coupling the first rectifier to the second rectifier;
wherein the first and second rectifiers comprise a plurality of diodes configured to rectify the first and second AC voltages into the first and second DC voltages, respectively; and
wherein the controller is configured to control the controllable switches to cause the first DC voltage to be supplied to the DC bus.

17. The system of claim 16 wherein the first and second rectifiers comprise a plurality of controllable switches; and
wherein the controller is configured to control the plurality of controllable switches to rectify the first and second AC voltages into the first and second DC voltages, respectively.

18. The system of claim 16 wherein the first rectifier comprises a plurality of controllable switches;
wherein the second rectifier comprises a plurality of diodes; and
wherein the controller is configured to control the plurality of controllable switches to rectify the first AC voltage into the first DC voltage.

19. An apparatus comprising:
a transformer comprising a secondary winding configured to inductively couple to a primary winding when a current is passed through the primary winding from an energy source;
a first rectifier coupled to the secondary winding and configured to rectify a first AC voltage from the secondary winding into a first DC voltage, the first rectifier comprising a first plurality of silicon-controlled rectifiers;
a second rectifier coupled to the secondary winding and configured to rectify a second AC voltage from the secondary winding into a second DC voltage;
a DC bus coupled to the first and second rectifiers and configured to receive the first and second DC voltages therefrom; and
a controller configured to control the first plurality of silicon-controlled rectifiers to rectify the first AC voltage into the first DC voltage;
wherein the first AC voltage is higher than the second AC voltage; and
wherein the first DC voltage is higher than the second DC voltage.

20. An apparatus comprising:
a transformer comprising a secondary winding configured to inductively couple to a primary winding when a current is passed through the primary winding from an energy source;
a first rectifier coupled to the secondary winding and configured to rectify a first AC voltage from the secondary winding into a first DC voltage;
a second rectifier coupled to the secondary winding and configured to rectify a second AC voltage from the secondary winding into a second DC voltage; and
a DC bus coupled to the first and second rectifiers and configured to receive the first and second DC voltages therefrom;
wherein the first and second rectifiers comprise a plurality of diodes configured to respectively rectify the first and second AC voltages into the first and second DC voltages; and
further comprising:
a controllable switch coupled to the DC bus and configured to couple the first rectifier to the second rectifier and to the DC bus; and
a controller configured to control the controllable switch to selectively couple the first rectifier to the DC bus to cause the first DC voltage to be transferred to the DC bus;
wherein the first AC voltage is higher than the second AC voltage; and
wherein the first DC voltage is higher than the second DC voltage.

* * * * *